United States Patent
Mann

[15] 3,688,257
[45] Aug. 29, 1972

[54] AUTOMOBILE ANTI-THEFT DEVICE

[72] Inventor: Thomas A. Mann, 1420 Amsterdam Ave., New York, N.Y.

[22] Filed: April 12, 1971

[21] Appl. No.: 133,243

[52] U.S. Cl. .....................340/64, 340/53, 180/114
[51] Int. Cl. .........................B60r 25/00, G08b 15/00
[58] Field of Search ........340/52, 53, 63, 64; 200/42, 200/61.44; 180/82.5, 114

[56] References Cited

UNITED STATES PATENTS 3,174,502   3/1965   Howarth et al. ....180/114 UX

*Primary Examiner*—Alvin H. Waring
*Attorney*—Richard S. Shreve, Jr.

[57] ABSTRACT

Apparatus in an automobile, rendered responsive when the engine is started without the use of the ignition key and the automobile is driven off actuates means for letting the air out of both rear tires whereby the automobile cannot be driven at any speed for any distance until the tires are reinflated.

4 Claims, 3 Drawing Figures

Patented Aug. 29, 1972
3,688,257
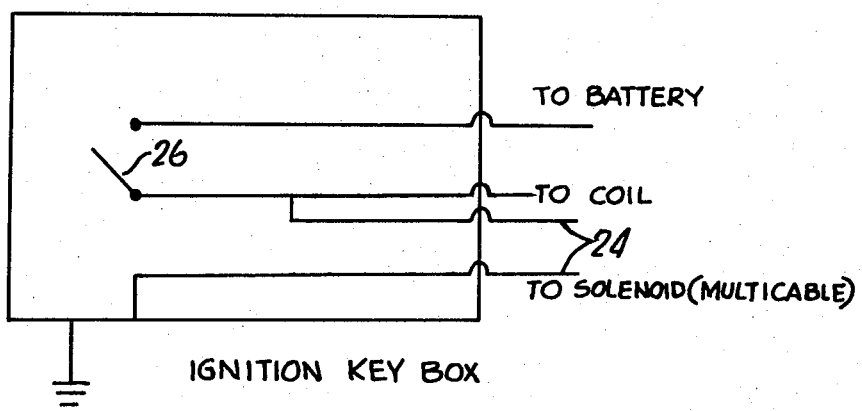
FIG. 1
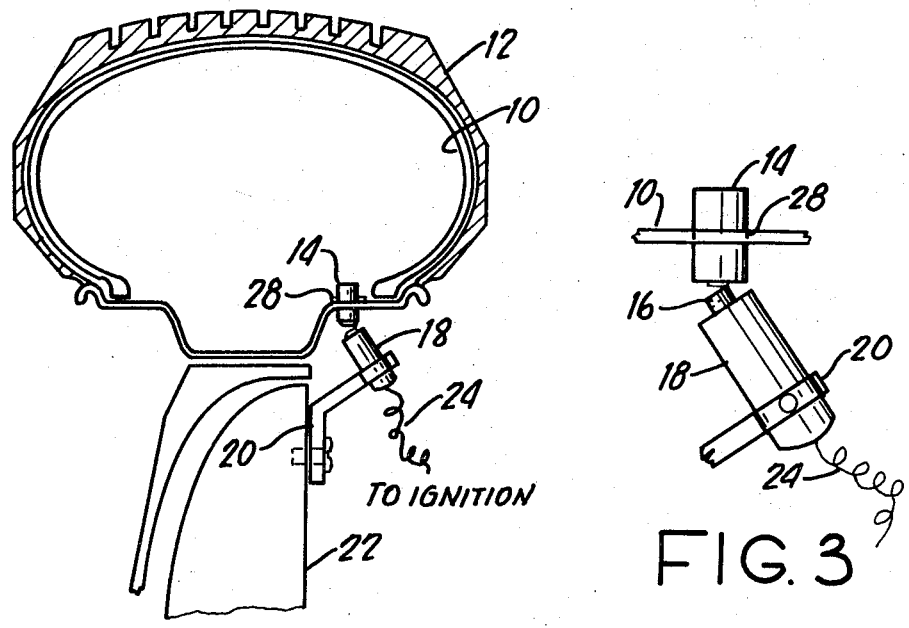
FIG. 2
FIG. 3
INVENTOR.
THOMAS A. MANN

AUTOMOBILE ANTI-THEFT DEVICE

SUMMARY OF THE INVENTION

My invention is directed toward apparatus installed in a vehicle to cause both rear tires to become rapidly deflated when the engine is started, normally by a thief, without the use of the ignition key and the vehicle is driven off.

To this end, I employ two solenoids, one for each rear wheel, connected in circuit with the ignition switch, whereby, when the switch is turned on with the use of the ignition key, the the solenoids are actuated, and when the switch is not turned on, the solenoids are deactuated whether or not the engine is running. Probe means associated with each wheel enable the vehicle to be driven in normal manner when the solenoids are actuated. When the solenoids are deactuated and the vehicle is driven off, the probe means cause rapid deflation of both rear tires whereby the vehicle cannot be driven any distance at any speed before repairs are made.

BRIEF DESCRIPTION OF THE DRAWINGS

In the drawings:

FIG. 1 is a circuit diagram of part of my invention;

FIG. 2 is a cross sectional view of a tire and rim showing my invention in use thereon; and FIG. 3 is a detail view of a portion of the structure shown in FIG. 2.

DETAILED DESCRIPTION OF PREFERRED EMBODIMENTS

Referring now to FIGS. 1–3, each rear tire rim 10 has a tire 12 therearound and an orifice 28 containing a removable plastic probe 14 protruding outwardly for a small distance as for example about 0.5 inches. This probe is adjacent a plunger 16 of a solenoid 18 secured by bracket 20 to brake drum 22. The solenoid is operated via cable 24 connected in circuit with the ignition key switch 26 and automobile battery as shown. When the solenoids are energized, their plungers are withdrawn and spaced from the probes and the tires can rotate in conventional manner. However, when the solenoids are deenergized, their plungers are extended. Under these conditions, should the vehicle be driven off without use of the ignition key, tire rotation will cause each probe 14 to strike and break against the corresponding plunger whereby an opening is produced and air escapes to deflate the tires as described.

In order to reflate the tires, new probes must be inserted in the orifices to seal same whereby the apparatus is ready for reuse.

While I have described my invention with particular reference to the drawings, such is not to be considered as limiting its actual scope.

Having thus described this invention, what is asserted as new is:

1. In combination with a vehicle having a plurality of rear wheels, each with rim, brake drum and tires and an ignition circuit including a key operated switch and a battery:

a like plurality of solenoids, each solenoid being associated with a corresponding wheel and connected in circuit whereby the solenoids are energized when the switch is turned on by the key and are otherwise deenergized; and a like plurality of means each associated with a corresponding wheel and solenoid to deflate the corresponding tire when the solenoid is deenergized and the vehicle is in motion.

2. The combination as set forth in claim 1 further including a like plurality of brackets, each bracket mounting the corresponding solenoid on the corresponding drum, each solenoid having a plunger which is retracted when the solenoid is energized and is extended when the solenoid is deenergized.

3. The combination as set forth in claim 2 wherein each of said means includes a probe extending through a bore in the corresponding rim.

4. The combination as set forth in claim 3 wherein each plunger when extended will contact the corresponding plug after suitable rotation of the corresponding wheel.

\* \* \* \* \*